United States Patent
Dang

(10) Patent No.: US 10,719,456 B2
(45) Date of Patent: Jul. 21, 2020

(54) METHOD AND APPARATUS FOR ACCESSING PRIVATE DATA IN PHYSICAL MEMORY OF ELECTRONIC DEVICE

(71) Applicant: ALIBABA GROUP HOLDING LIMITED, George Town, Grand Cayman (KY)

(72) Inventor: Maochang Dang, Hangzhou (CN)

(73) Assignee: ALIBABA GROUP HOLDING LIMITED, George Town, Grand Cayman (KY)

(*) Notice: Subject to any disclaimer, the term of this patent is extended or adjusted under 35 U.S.C. 154(b) by 0 days.

(21) Appl. No.: 15/836,724

(22) Filed: Dec. 8, 2017

(65) Prior Publication Data

US 2018/0101485 A1 Apr. 12, 2018

Related U.S. Application Data

(63) Continuation of application No. PCT/CN2016/084440, filed on Jun. 2, 2016.

(30) Foreign Application Priority Data

Jun. 9, 2015 (CN) .......................... 2015 1 0314210

(51) Int. Cl.
*G06F 12/00* (2006.01)
*G06F 12/14* (2006.01)
(Continued)

(52) U.S. Cl.
CPC ...... *G06F 12/1425* (2013.01); *G06F 9/45558* (2013.01); *G06F 12/023* (2013.01);
(Continued)

(58) Field of Classification Search
CPC ............. G06F 12/1425; G06F 9/45558; G06F 12/023; G06F 12/145; G06F 2009/45583;
(Continued)

(56) References Cited

U.S. PATENT DOCUMENTS

| 2009/0113110 A1* | 4/2009 | Chen .................. G06F 9/45558 |
| | | 711/6 |
| 2012/0233360 A1 | 9/2012 | Go et al. |

(Continued)

FOREIGN PATENT DOCUMENTS

| CN | 101281580 A | 10/2008 |
| CN | 101349980 A | 1/2009 |

(Continued)

OTHER PUBLICATIONS

First Search Report issued in related foreign Application No. 201510314210.2 (1 pg.).

(Continued)

*Primary Examiner* — Reginald G Bragdon
*Assistant Examiner* — Edward Wang
(74) *Attorney, Agent, or Firm* — Finnegan, Henderson, Farabow, Garrett & Dunner LLP

(57) ABSTRACT

Embodiments of the disclosure provide a method and an apparatus for accessing private data in a physical memory of an electronic device, wherein the method includes: receiving a request for accessing private data in the physical memory from a process running in the electronic device; and accessing private data in a particular physical address interval of the physical memory through a secure memory access interface added to a virtual machine monitor of the electronic device, wherein a mapping relationship for the particular physical address interval is not established in a memory management unit of the electronic device, and the secure memory access interface is pre-designed to realize access to the private data in the particular physical address interval of the physical memory. The method and the apparatus of the present application can enhance security of private data in a physical memory.

29 Claims, 6 Drawing Sheets

(51) Int. Cl.
*G06F 9/455* (2018.01)
*G06F 12/02* (2006.01)

(52) U.S. Cl.
CPC .. *G06F 12/145* (2013.01); *G06F 2009/45583* (2013.01); *G06F 2009/45587* (2013.01); *G06F 2212/1044* (2013.01); *G06F 2212/1052* (2013.01)

(58) Field of Classification Search
CPC ... G06F 2009/45587; G06F 2212/1044; G06F 2212/1052
See application file for complete search history.

(56) References Cited

U.S. PATENT DOCUMENTS

| | | | | |
|---|---|---|---|---|
| 2013/0205360 | A1* | 8/2013 | Novak | H04L 63/102 726/1 |
| 2018/0082078 | A1* | 3/2018 | Suzuki | G06F 16/258 |

FOREIGN PATENT DOCUMENTS

| | | |
|---|---|---|
| CN | 102523215 A | 6/2012 |
| CN | 103309519 A | 9/2013 |
| CN | 103678175 A | 3/2014 |
| CN | 104169891 A | 11/2014 |
| CN | 104751050 A | 7/2015 |
| WO | WO 2014/164536 A1 | 10/2014 |

OTHER PUBLICATIONS

First Office Action issued from the Intellectual Property Office of People's Republic of China in corresponding foreign Application No. 201510314210.2 (7 pgs.).

PCT International Preliminary Report on Patentability, Written Opinion and International Search Report issued in corresponding PCT Application No. PCT/CN2016/084440; dated Aug. 26, 2016 (14 pgs.).

* cited by examiner

METHOD AND APPARATUS FOR ACCESSING PRIVATE DATA IN PHYSICAL MEMORY OF ELECTRONIC DEVICE

CROSS REFERENCE TO RELATED APPLICATION

The disclosure claims the benefits of priority to International Application No. PCT/CN2016/084440, filed Jun. 2, 2016, which is based on and claims the benefits of priority to Chinese Application No. 201510314210.2, filed Jun. 9, 2015, both of which are incorporated herein in their entireties.

BACKGROUND

Conventionally, for most of current electronic devices such as computers and mobile phones, private data (for example, an account name and a payment password of a user account) in a physical memory of an electronic device lacks protection. The private data and common data are both managed by a memory management unit without distinction. An operating system can access the private data in the physical memory based on an address mapping relationship established by the memory management unit under any circumstances. As a result, a hacker may attack the operating system by using a malicious program or a virus to gain an access permit to the operating system, and may freely access the private data in the electronic device. Therefore, the privacy security of a user can be seriously threatened.

SUMMARY

According to some embodiments of the present application, a method for accessing private data in a physical memory of an electronic device is provided. The method includes: receiving a request for accessing private data in the physical memory from a process running in the electronic device; and accessing private data in a particular physical address interval of the physical memory through a secure memory access interface added to a virtual machine monitor of the electronic device, wherein a mapping relationship for the particular physical address interval is not established in a memory management unit of the electronic device, and the secure memory access interface is pre-designed to realize access to the private data in the particular physical address interval of the physical memory.

According to some embodiments of the present application, an apparatus for accessing private data in a physical memory of an electronic device is provided. The apparatus includes: a receiving unit configured to receive a request for accessing private data in the physical memory from a process running in the electronic device; and an access unit configured to access private data in a particular physical address interval of the physical memory through a secure memory access interface added to a virtual machine monitor of the electronic device, wherein a mapping relationship for the particular physical address interval is not established in a memory management unit of the electronic device, and the secure memory access interface is pre-designed to realize access to the private data in the particular physical address interval of the physical memory.

The disclosed embodiments enhance security of private data in a physical memory. Moreover, the embodiments of the present disclosure add a secure memory access interface to a virtual machine monitor of an electronic device, so that private data in a physical memory can be accessed only through the secure memory access interface, and cannot be normally accessed by using an operating system, thus preventing a malicious program or a virus from intercepting (an interception manner includes memory dump, memory replication, or the like, where memory dump may refer to transferring data from the memory to another storage device) the private data in the physical memory by gaining an access permission to the operating system, and further enhancing security of the private data in the physical memory.

DETAILED DESCRIPTION

Figure 1:
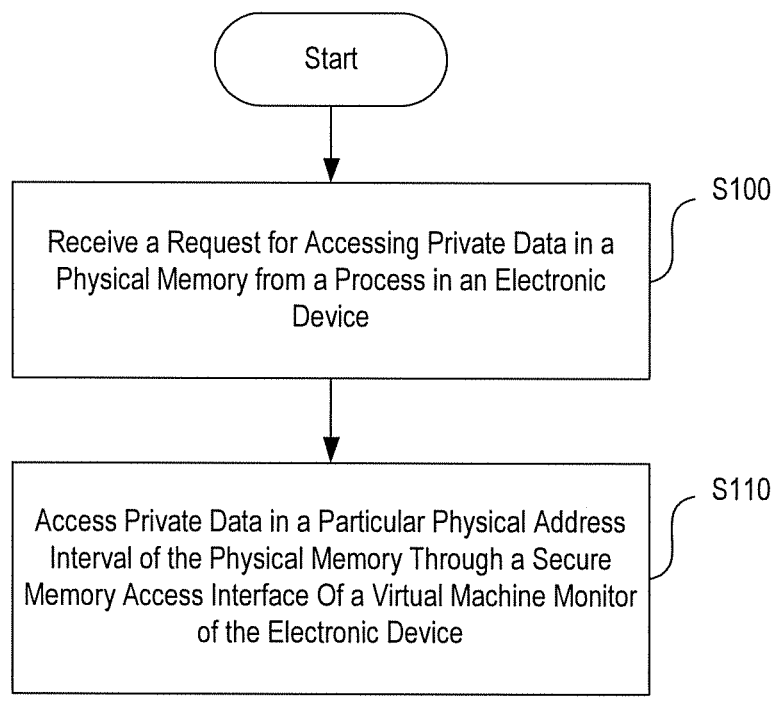
FIG. 1 is a flowchart of a method for accessing private data in a physical memory of an electronic device according to embodiments of the present disclosure.

The present disclosure is further described in detail below with reference to the accompanying drawings.

Before a more detailed discussion of the exemplary embodiments, it should be noted that some exemplary embodiments are described as processing or methods depicted in the flowcharts. Although the flowcharts describe the operations as sequential processing, many of these operations may be implemented concurrently or simultaneously. In addition, the sequence of the operations can be rearranged. The processing may be terminated when its operations are completed, but may also include additional steps not shown in the drawings. The processing may correspond to a method, function, procedure, subroutine, subprogram, or the like.

The term "computer" in the context, also called "computing device", refers to an intelligent electronic device that can perform predetermined processing such as numerical calculation and/or logical calculation by running a predetermined program or instruction, which may include a processor and a storage device. The predetermined processing is performed by the processor by executing sustained instructions pre-stored in the storage device, or performed by hardware such as an ASIC, an FPGA, or a DSP, or performed by a combination of the two. Computers include, but are not limited to, servers, personal computers, laptop computers, tablet computers, smart phones, smart watches, etc.

The computer includes user equipment and a network device. The user equipment includes, but is not limited to, a computer, a smart phone, a PDA, a smart watch, or the like; the network device includes, but is not limited to, a single network server, a server group consisting of multiple network servers, or a cloud based on cloud computing and consisting of numerous computers or network servers, where the cloud computing is one type of distributed computing and is a super virtual computer consisting of a group of loosely coupled computer sets. The computer may be operated separately to implement the present application, and may also access a network and interact with other computers in the network to implement the present application. The network in which the computer is located includes, but is not limited to, the Internet, a wide area network, a metropolitan area network, a local area network, a VPN network, or the like.

It should be noted that the described user equipment, network device and network are only examples. And other existing or possible computers or networks in the future, if applicable to the present application, are also covered within the scope of the present disclosure and are included herein by reference.

The methods discussed below may be implemented by using hardware, software, firmware, middleware, microcode, hardware description language, or any combination thereof. When the methods are implemented by using software, firmware, middleware, or microcode, the program codes or code segments used to implement necessary tasks may be stored in a machine or a computer-readable medium (such as a storage medium). At least one processor can implement the necessary tasks.

The specific structural and functional details disclosed herein are merely illustrative and are intended to describe the exemplary embodiments of the present disclosure. The present disclosure may be implemented in many alternative forms and should not be construed to be limited only to the embodiments set forth herein.

It should be understood that, although the terms "first," "second," and the like are probably used herein to describe units, these units should not be limited by these terms. The use of these terms only aims to distinguish one unit from another. For example, without departing from the scope of the exemplary embodiments, a "first unit" may be referred to as a "second unit," and similarly a "second unit" may be referred to as a "first unit". As used herein, the term "and/or" includes any and all combinations of one or more of the listed associated items.

It should be understood that, when a unit is described as being "connected" or "coupled" to another unit, the unit may be directly connected or coupled to another unit, or there may be an intermediate unit. In contrast, when a unit is described as being "directly connected" or "directly coupled" to another unit, there is no intermediate unit. Other phrases (for example, "located between" in contrast to "directly located between", "adjacent to" in contrast to "directly adjacent to") used to describe a relationship between units should be interpreted in a similar manner.

The terminologies used herein are for the purpose of describing particular embodiments only and are not intended to limit the exemplary embodiments. Unless clearly specified otherwise in the context, the singular forms "a" and "an" used herein are also intended to include the plural forms. It should be further understood that, the terms "include" and/or "comprise" used herein specify the presence of the stated features, integers, steps, operations, units and/or components, but do not exclude the presence or addition of one or more other features, integers, steps, operations, units, components, and/or a combination thereof.

It should be further mentioned that, in some alternative implementations, the mentioned functions/actions may occur in an order different from those indicated in the accompanying drawings. For example, the involved functions/actions in two drawings shown in succession may be actually executed basically simultaneously or sometimes in a reverse order.

Referring to FIG. 1, the method for accessing private data in a physical of an electronic device can include steps S100 and S110.

In step S100, a request for accessing the private data in the physical memory is received from a process running in the electronic device.

The process can include a program instance that is running in the electronic device (for example, a computer). For example, when an instant messaging application program "A" is running, the application program probably can include two processes, including Aprotect.exe and A.exe. Both of the processes run in the electronic device.

Generally, for processes of each application program that run in the electronic device, a private physical address interval may be assigned to each process, and generally each process can only access (e.g., read and/or write) data in its own private physical address interval.

The private data, as described above, can include at least one of plaintext obtained by decrypting a ciphertext file in a storage device, data generated as a program of the electronic device runs, data (including videos, audios, photos and/or pictures) acquired by the electronic device externally, or the like.

The request for accessing private data in the physical memory can include at least one of a request for allocating a storage interval of the physical memory to the private data, a request for writing data (e.g., the private data) into a certain storage interval (e.g., a private interval) of the physical memory, a request for reading the private data from a certain storage interval (e.g., the private interval) of the physical memory, a request for releasing a certain storage interval of the physical memory that is pre-allocated to the private data, and the like.

In some embodiments, step S100 can further include: receiving a request for accessing private data in the physical memory from the process running in the electronic device; and determining whether the data is private.

The determination may be executed automatically by an application program in the electronic device, or may be implemented by responding to a user operation.

For example, the determination may be implemented in at least one of the manners described below.

In a first manner, if the data is plaintext obtained by decrypting a ciphertext file in a storage device, it is determined that the data is private data.

In a second manner, if the data is generated by running a program of the electronic device, it is determined that the data is private data through a determination routine.

The determination routine may be pre-stored in a database of the electronic device, and when the program of the electronic device runs, the determination routine may automatically determine whether the data generated by running the program is private data.

The data generated by running the program can include common parameters that do not need private protection and data that needs private protection. Therefore, a routine is used to determine a type of the private data.

In a third manner, if the data is acquired by the electronic device externally, a user is prompted whether to store the externally acquired data as private data; and in response to a confirmation made by the user that the externally acquired data needs to be stored as private data, it is determined that the data is private.

Some of the externally acquired data are merely common data and do not need to be protected as private data, while some are confidential data and need to be protected as private data. Moreover, the type of the externally acquired data cannot be determined by a routine, because the externally acquired data is complicated. Therefore, the user may have to manually determine whether the data needs private protection.

For example, the electronic device is connected to a mobile phone using a data wire, and a mobile phone application management program for managing applications of the mobile phone is installed in the electronic device. In a procedure of running the mobile phone application management program in the electronic device, processes included in the mobile phone application management program and running in the electronic device need to access data acquired from the externally connected mobile phone. In such a case, the electronic device may prompt the user whether to store the data acquired from the externally connected mobile phone as private data. If the user makes a confirmation, the data acquired from the externally connected mobile phone can be stored as private data in response to the confirmation of the user, and it is determined that the data is private.

Continuing to refer to FIG. 1, the method for accessing private data in a physical memory of an electronic device further includes step S110.

In step S110, private data in a physical address interval of the physical memory is accessed through a secure memory access interface added to a virtual machine monitor of the electronic device. At this point, a mapping relationship for the physical address interval is not established in a memory management unit of the electronic device, and the secure memory access interface is pre-designed to realize access to the private data in the physical address interval of the physical memory.

The virtual machine monitor (e.g., a Hypervisor) may include system software that runs in the electronic device and may be used for maintaining a relatively independent environment between different processes. The environment can support different processes to access respective data stored in the physical memory.

The secure memory access interface can be designed to enable a secure application program to access the private data in the physical address interval of the physical memory. The secure memory access interface can be an application program interface and may include a pre-defined function, subprogram, or program.

The secure application program may include an application program developed on the basis of the secure memory access interface. For example, the secure memory access interface is provided for a developer of a communication software application program. The developer can then substitute a first code segment in the communication software application program with a second code segment using the secure memory access interface. In this way, the communication software application program can be converted into a secure communication software application program. The secure communication software application program can access the private data in the physical address interval of the physical memory on the basis of the secure memory access interface.

For security, the secure memory access interface can be customized by a manufacturer of the electronic device. Therefore, for each electronic device, security of the private data in the physical memory of the electronic device can be enhanced on a device-level.

The physical address interval in the physical memory can include a continuous secure physical memory address interval reserved in the physical memory. A mapping relationship for the secure physical memory address interval is not set in the memory management unit of the electronic device.

Figure 2:
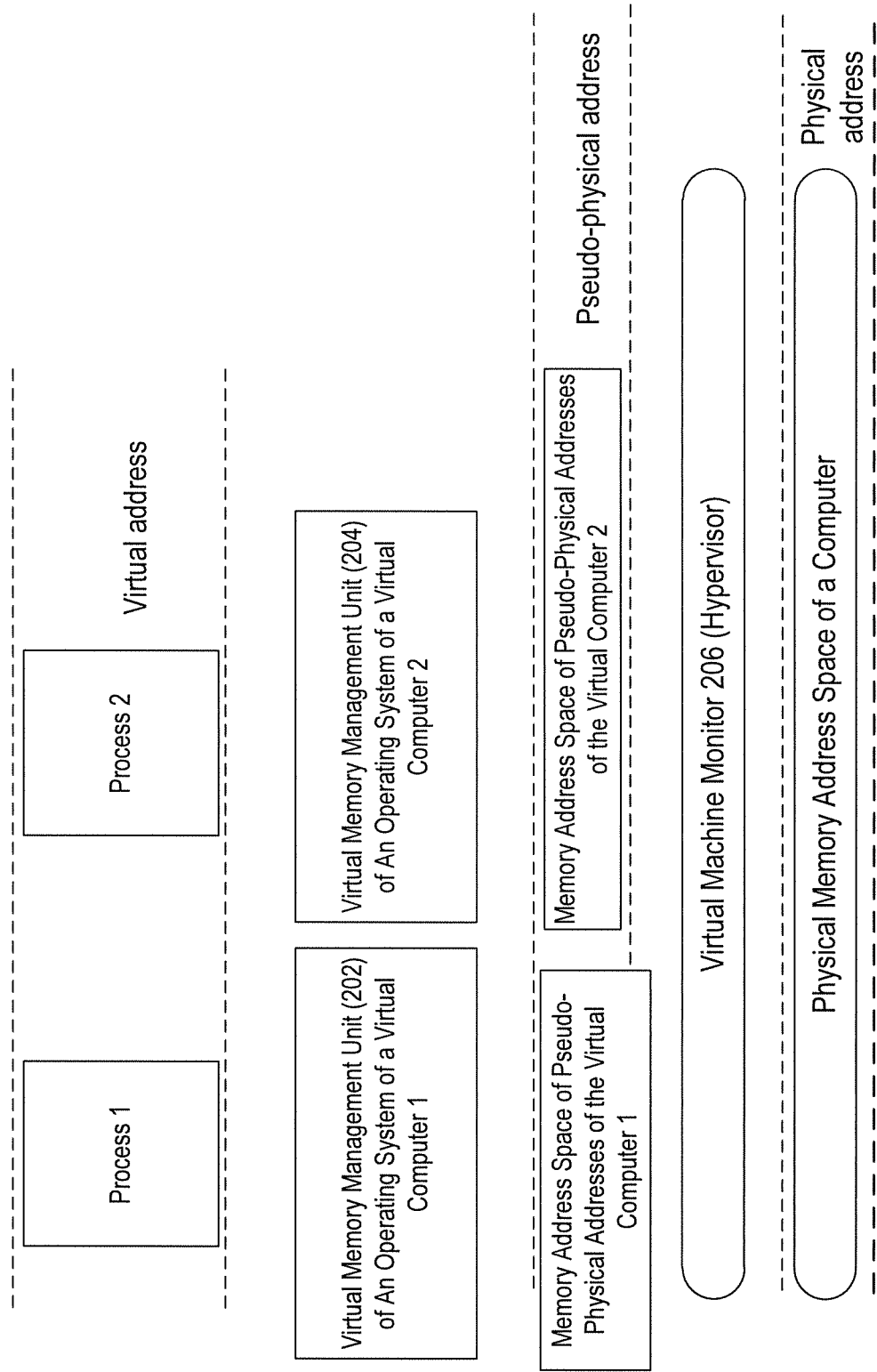
FIG. 2 is a schematic diagram of an address mapping relationship for a physical memory of an electronic device.

Reference may be made to FIG. 2 for the understanding of a conventional mapping relationship. FIG. 2 is a schematic diagram showing that an address mapping relationship for a physical memory of an electronic device is set on the basis of a memory management unit.

Conventionally, by using an example in which the electronic device is a computer, a virtual memory technology (for example, a virtual memory paging management technology or virtual memory page-segment storage management) can be used to at least partially solve the problem of insufficient memory, as the computer has a limited physical memory. In the case where the virtual memory technology is used, a memory management unit (also referred to as a real memory management unit herein so as to be distinguished from a virtual memory management unit in the following description) can be used to set a mapping relationship between addresses in the physical memory and pseudo-physical addresses of a virtual computer. The memory management unit (i.e., the real memory management unit) can also set a mapping relationship between the pseudo-physical addresses and virtual addresses assigned to the processes. In this way, an operating system of the computer may access the physical memory using the address mapping relationship.

More specifically, referring to FIG. 2, in a procedure of managing the physical memory of the computer using the virtual memory technology, each process can be allocated with a virtual address space of the process itself. A first mapping from the virtual address spaces to pseudo-physical addresses in the virtual computer can be established using a virtual memory management unit (e.g., virtual MMU 202 and 204) of a virtual computer operating system established on the basis of the computer. And a second mapping from the pseudo-physical addresses to physical memory addresses in the physical memory can be established using the virtual machine monitor 206 (e.g., a Hypervisor). Either the first mapping or the second mapping may be considered to be set by the real memory management unit of the computer in a unified way. And the setting can be realized through management by the real memory management unit over the virtual memory management unit (virtual MMU) and the virtual machine monitor (e.g., the Hypervisor).

As described above, for the physical memory to which the mapping relationship has been set, the operating system of the computer may access the physical memory using the address mapping relationship. Therefore, a hacker may attack the operating system of the computer by using a malicious program to gain an operation permit to the operating system of the computer and freely access the private data in the electronic device. This can seriously threaten the privacy security of a user.

Figure 3:
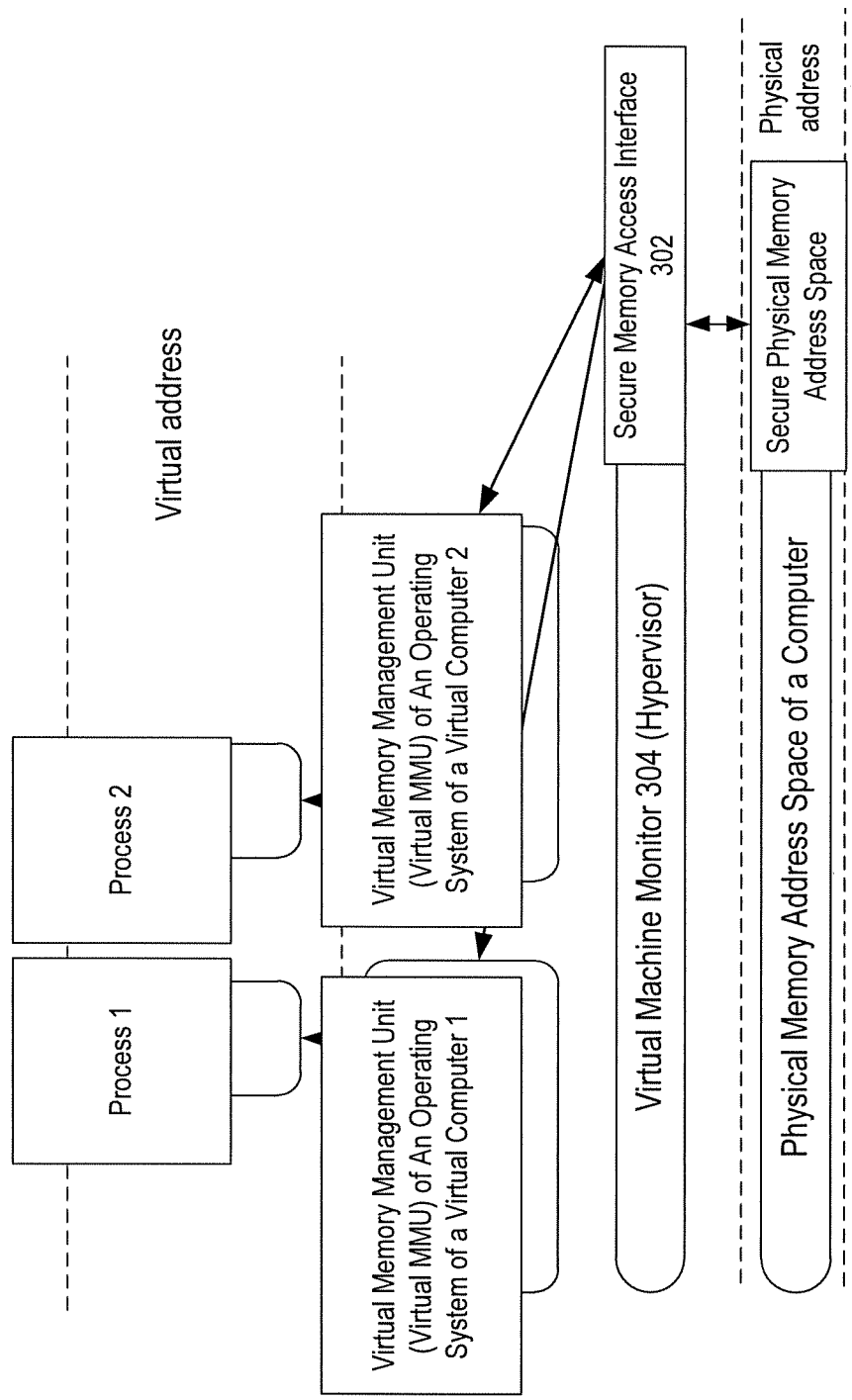
FIG. 3 is a schematic structural diagram of accessing private data in a secure physical memory address space according to embodiments of the present disclosure.

Embodiments of the disclosure provide a method to solve the foregoing problem and enhance security of the private data in the physical memory. With reference to FIG. 3, in some embodiments, a mapping relationship for the physical address interval is not established in the memory management unit of the electronic device. Instead, the private data in the physical address interval (e.g., a secure physical memory address space) is accessed through a secure memory access interface 302 added to the virtual machine monitor 304. That is, a mapping relationship between the virtual addresses and the pseudo-physical addresses for the access to the private data is not established in the virtual memory management unit (virtual MMU). Instead, the virtual memory management unit can access the private data in the secure physical memory address space through secure memory access interface 302.

The secure memory access interface in the embodiments is customized by the manufacturer of the electronic device, and is only provided for a developer of a secure program certificated by the manufacturer. Therefore, the secure memory access interface generally would not be gained by a developer of a malicious program. In this way, when the physical memory of the electronic device is accessed without the secure memory access interface, the malicious program cannot access the private data in the physical memory by attacking the operating system of the computer and using the address mapping relationship. Therefore, the security of the private data in the physical memory can be enhanced.

It should be noted that, FIG. 3 does not show the pseudo-physical address as shown in FIG. 2 to more clearly describe a structure for access to private data in a secure physical memory address space. However, access to data other than data in the secure physical memory address space in the computer physical memory can also be managed with reference to the virtual memory technology shown in FIG. 2.

In some embodiments, referring back to FIG. 1, step S110 can further include allocating, through the secure memory access interface, a physical address subinterval in the physical address interval to the private data to be accessed.

For example, if the physical address interval is greater than 1 gigabyte (GB) (a start address is, for example, 0x80000000), a physical address subinterval of 1 GB in the physical address interval is allocated to the private data. For example, a physical address subinterval having a start address of 0x80000000 and an end address 0xBFFFFFFF can be allocated to the private data.

Step S110 can further include accessing the private data in the physical address subinterval. For example, the private data is written into the allocated physical address subinterval.

In some embodiments, the method for accessing private data in a physical memory of an electronic device further includes: in response to a predetermined condition, releasing the physical address subinterval that is in the physical address interval and corresponds to the private data.

The predetermined condition may include terminating a process that needs to access the private data. When the process terminates, a physical address subinterval previously occupied by the private data may be released to enhance utilization of the physical memory, wherein the private data can be accessed by the process.

Figure 4:
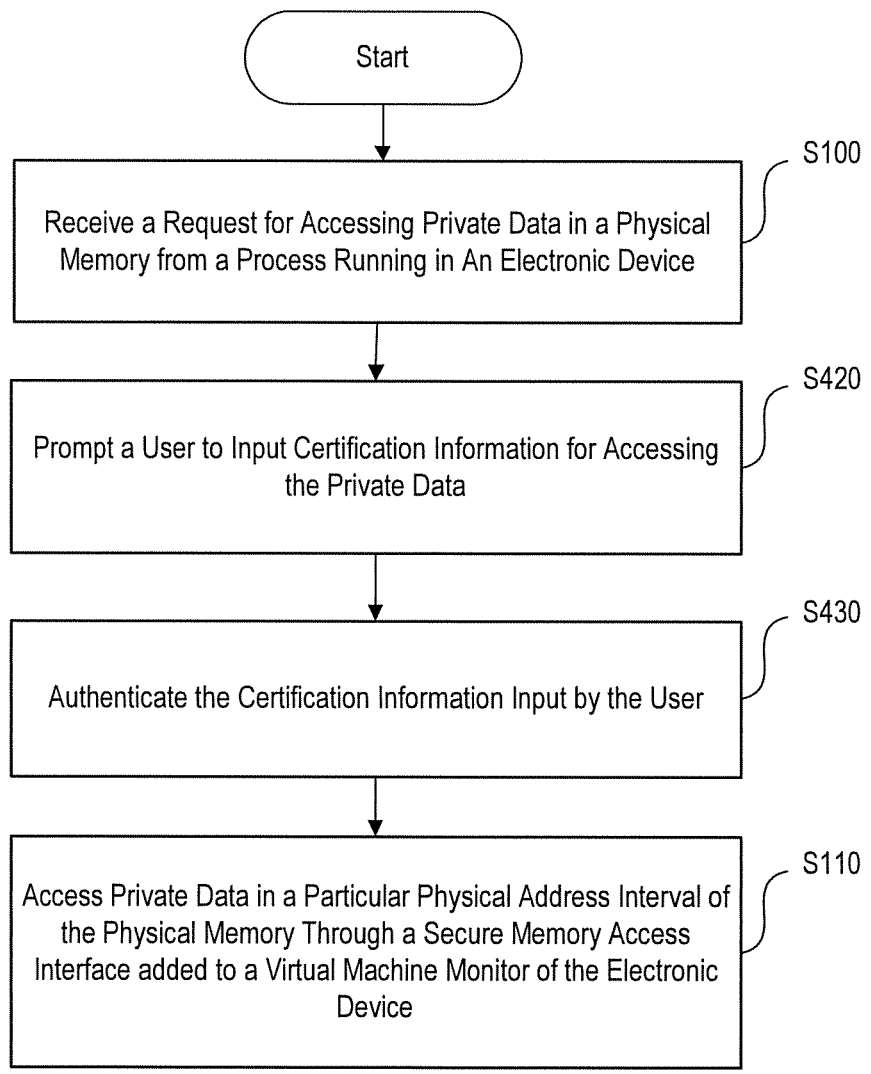
FIG. 4 is a flowchart of a method for accessing private data in a physical memory of an electronic device according to embodiments of the present disclosure.

In some embodiments, referring to FIG. 4, the method for accessing private data in a physical memory of an electronic device further includes steps S420 and S430.

In step S420, a user is prompted to input certification information for accessing the private data.

In step S430, the certification information input by the user is authenticated, where the step of accessing private data in a physical address interval of the physical memory through a secure memory access interface added to a virtual machine monitor of the electronic device is performed only when the authentication succeeds.

A manner used by the user to input certification information for accessing the private data can include inputting personal identity certification information (for example, a login account and password, or avatar certification) by the user, running a secure application program, or the like.

In some embodiments, the certification information can include personal identity certification information. The authentication may include verifying the personal identity certification information, and determining whether the personal identity certification information is associated with the user. When a secure application program is running, the authentication may include determining whether the secure application program is a secure application program certificated by a manufacturer providing the secure memory access interface.

According to embodiments of the present disclosure, an apparatus for accessing private data in a physical memory of an electronic device is provided. The apparatus for accessing private data in a physical memory of an electronic device may be implemented as complete software for managing the physical memory in the electronic device, or a combination of both software and hardware for managing the physical memory in the electronic device. For example, embodiments described herein can be implemented using one or more modules/units (and any corresponding sub-modules/sub-units), which can be a packaged functional hardware unit designed for use with other components (e.g., portions of an integrated circuit) and/or a part of a program (stored on a computer readable medium, e.g. a non-volatile storage medium) that performs a particular function of related functions. The one or more modules can have entry and exit points and can be written in a programming language, such as, for example, Java, Lua, C, or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a non-transitory computer readable medium, such as a compact disc, digital video disc, RAM, ROM, flash drive, or any other non-transitory medium, or as a digital download (and can be originally stored in a compressed or installable format that requires installation, decompression, or decryption prior to execution). Such software code can be stored, partially or fully, on a memory device of the executing computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors.

Figure 5:
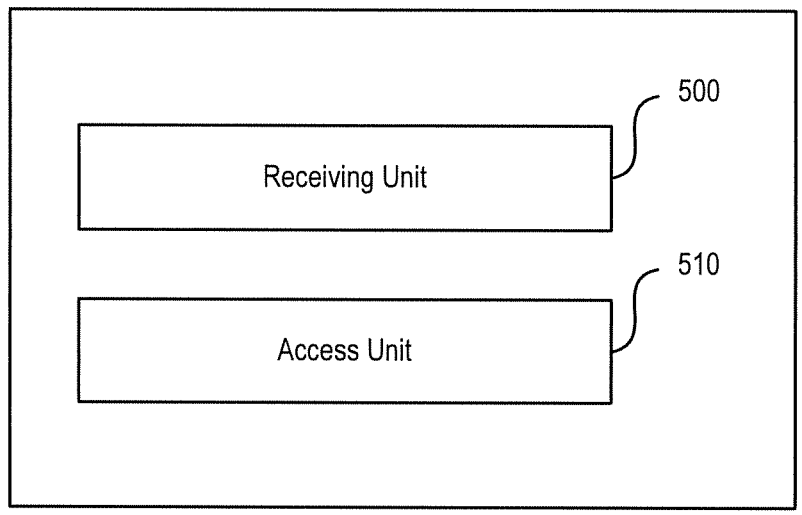
FIG. 5 is a schematic block diagram of an apparatus for accessing private data in a physical memory of an electronic device according to embodiments of the present disclosure.

Referring to FIG. 5, the apparatus for accessing private data in a physical memory of an electronic device can include a receiving unit 500 and an access unit 510.

Receiving unit 500 can be configured to receive a request for accessing the private data in the physical memory from a process running in the electronic device.

Access unit 510 can be configured to access private data in a physical address interval of the physical memory through a secure memory access interface added to a virtual machine monitor of the electronic device, where a mapping relationship for the physical address interval is not established in a memory management unit of the electronic device, and the secure memory access interface is pre-designed to realize access to the private data in the physical address interval of the physical memory.

In some embodiments, the accessing can include reading and/or writing data.

Optionally, receiving unit 500 can be further configured to: receive a request for accessing data in the physical memory from a process running in the electronic device; and determine whether the data is private.

Optionally, receiving unit 500 can be further configured to determine that the data is private if the data is plaintext obtained by decrypting a ciphertext file in a storage device.

Optionally, receiving unit 500 can be further configured to determine that the data is private data through a determination routine if the data is generated by a program of the electronic device.

Further, receiving unit 500 can be also configured to prompt a user whether to store the externally acquired data as private data if the data is acquired by the electronic device externally; and determine that the data is private in response to a confirmation made by the user that the externally acquired data needs to be stored as private data.

In some embodiments, access unit 510 is configured to allocate, through the secure memory access interface, a corresponding physical address subinterval in the physical address interval to the private data to be accessed; and access the private data in the physical address subinterval.

Further, the access unit 510 can be configured to: release the physical address subinterval which is in the physical address interval and corresponds to the private data in response to a predetermined condition.

Figure 6:
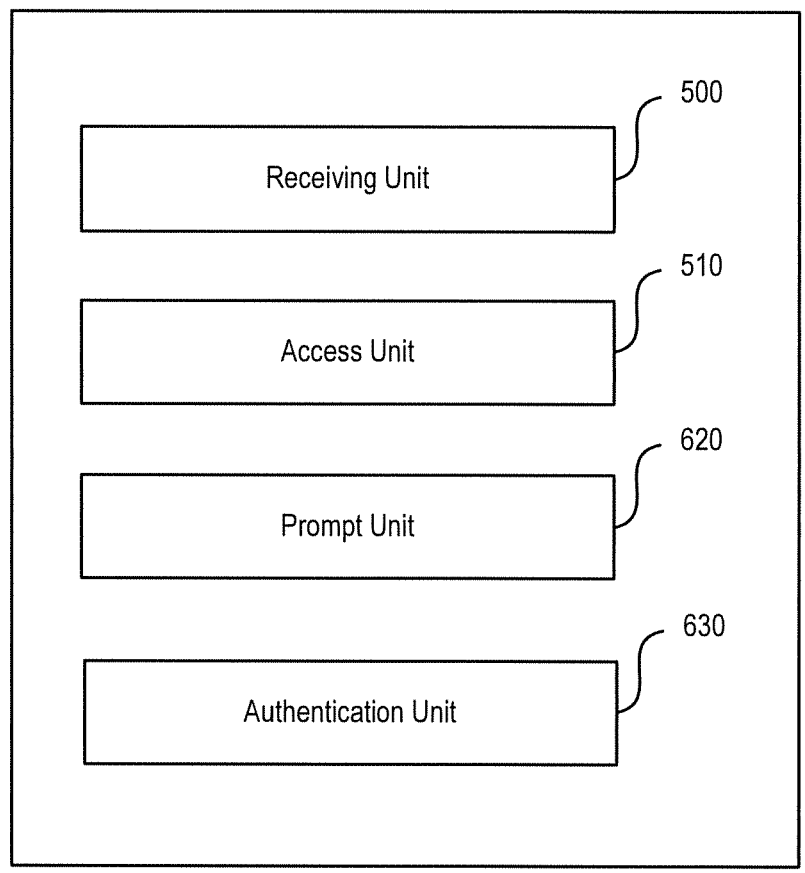
FIG. 6 is a schematic block diagram of an apparatus for accessing private data in a physical memory of an electronic device according to embodiments of the present disclosure.

Optionally, referring to FIG. 6, the apparatus for accessing private data in a physical memory of an electronic device can further include: a prompt unit 620 and an authentication unit 630.

Prompt unit 620 can be configured to prompt a user to input certification information for accessing the private data.

Authentication unit 630 can be configured to authenticate the certification information input by the user.

Access unit 510 is configured to access the private data in the physical address interval of the physical memory through the secure memory access interface added to the virtual machine monitor of the electronic device only when the authentication succeeds.

It should be understood that, the structural block diagrams shown in FIGS. 5-6 are merely examples, and are not intended to limit the scope of the present application. In some cases, some units may be added or omitted according to a specific situation.

It is known to persons skilled in the art that the present application may be implemented as a system, a method, or a computer program product. It is appreciated that the above units are merely examples. In practice, they may be separate units, or any two units may be integrated in one unit, or all units may be integrated in one unit.

The flowcharts and block diagrams in the accompanying drawings show the system architectures, functions, and operations that may be implemented in accordance with the systems, methods, and computer program products in multiple embodiments of the present application. In this regard, each box in the flowcharts or block diagrams may represent a module, a program segment, or a part of code, where the module, program segment, or part of code includes one or more executable instructions for implementing the prescribed logic functions. It should be further noted that, in some alternative implementations, the functions marked in the boxes may also occur in an order different from those marked in the accompanying drawings. For example, two consecutive boxes can actually be executed substantially in a concurrent manner, or sometimes in a reverse order, which depends on the involved functions. It should be further noted that each box in the block diagrams and/or flowcharts, as well as a combination of boxes in the block diagrams and/or flowcharts, can be implemented by using a dedicated hardware-based system that performs specified functions or operations, or can be implemented by using a combination of dedicated hardware and computer instructions.

It will be apparent to those skilled in the art that the present application is not limited to details of the exemplary embodiments described above, and can be implemented in other specific forms without departing from the spirit or basic features of the present application. Therefore, in any case, the embodiments should be considered to be illustrative rather than restrictive. The scope of the present application is defined by the appended claims rather than the foregoing descriptions, and therefore, all changes falling in the implication and scope of equivalent elements of the claims are included in the present application. Any numeral sign in the accompanying drawings in the claims should not be construed as a limitation on the claims.

What is claimed is:

1. A method for accessing private data in a physical memory of an electronic device, comprising:
   receiving a request for accessing the private data from a process running in the electronic device; and
   accessing private data in a physical address interval of the physical memory through a secure memory access interface of a virtual machine monitor of the electronic device, wherein the secure memory access interface accesses the private data in the physical address interval of the physical memory without using a mapping relationship, associated with the physical address interval for the private data.

2. The method of claim 1, wherein the access comprises at least one of reading or writing the private data.

3. The method of claim 1, wherein accessing private data in a physical address interval of the physical memory through a secure memory access interface of a virtual machine monitor of the electronic device comprises:
   allocating, through the secure memory access interface, a physical address subinterval in the physical address interval to the private data; and
   accessing the private data in the physical address subinterval.

4. The method of claim 3, further comprising:
   releasing the physical address subinterval corresponding to the private data in response to a predetermined condition.

5. The method of claim 1, wherein receiving a request for accessing private data in the physical memory from a process in the electronic device comprises:
   receiving a request for accessing data in the physical memory from the process; and
   determining whether the data is private.

6. The method of claim 5, wherein determining whether the data is private comprises:
   in response to the data being plaintext obtained by decrypting a ciphertext file in a storage device, determining that the data is private.

7. The method of claim 5, wherein determining whether the data is private comprises:
   in response to the data being generated by a program of the electronic device, determining that the data is private through a determination routine.

8. The method of claim 5, wherein determining whether the data is private comprises:
   in response to the data being acquired by the electronic device externally, prompting a user whether to store the externally acquired data as private data; and determining that the data is private in response to a confirmation made by the user that the externally acquired data needs to be stored as private data.

9. The method of claim 1, further comprising:
prompting a user to input certification information for accessing the private data; and
authenticating the certification information, wherein accessing private data in the physical address interval of the physical memory through a secure memory access interface of a virtual machine monitor of the electronic device is performed when the authentication succeeds.

10. The method of claim 1, wherein a mapping relationship for the physical address interval is not established in a memory management unit of the electronic device.

11. An apparatus for accessing private data in a physical memory of an electronic device, comprising:
a memory storing a set of instructions; and
at least one processor configured to execute the set of instructions to cause the apparatus to:
receive a request for accessing the private data from a process running in the electronic device; and
access private data in a physical address interval of the physical memory through a secure memory access interface of a virtual machine monitor of the electronic device, wherein the secure memory access interface is configured to access the private data in the physical address interval of the physical memory without using a mapping relationship associated with the physical address interval for the private data.

12. The apparatus of claim 11, wherein the access comprises at least one of reading or writing the private data.

13. The apparatus of claim 11, wherein the at least one processor is configured to execute the set of instructions to further cause the apparatus to:
allocate, through the secure memory access interface, a physical address subinterval in the physical address interval to the private data; and
access the private data in the physical address subinterval.

14. The apparatus of claim 13, wherein the at least one processor is configured to execute the set of instructions to further cause the apparatus to:
release the physical address subinterval corresponding to the private data in response to a predetermined condition.

15. The apparatus of claim 11, wherein the at least one processor is configured to execute the set of instructions to further cause the apparatus to:
receive a request for accessing data in the physical memory from the process; and
determine whether the data is private.

16. The apparatus of claim 15, wherein the at least one processor is configured to execute the set of instructions to further cause the apparatus to:
in response to the data being plaintext obtained by decrypting a ciphertext file in a storage device, determine that the data is private.

17. The apparatus of claim 15, wherein the at least one processor is configured to execute the set of instructions to further cause the apparatus to:
in response to the data being generated by a program of the electronic device, determine that the data is private through a determination routine.

18. The apparatus of claim 15, wherein the at least one processor is configured to execute the set of instructions to further cause the apparatus to:
in response to the data being acquired by the electronic device externally, prompt a user whether to store the externally acquired data as private data; and
determine that the data is private in response to a confirmation made by the user that the externally acquired data needs to be stored as private data.

19. The apparatus of claim 11, wherein the at least one processor is configured to execute the set of instructions to further cause the apparatus to:
prompt a user to input certification information for accessing the private data; and
authenticate the certification information, wherein accessing private data in the physical address interval of the physical memory through a secure memory access interface of a virtual machine monitor of the electronic device is performed when the authentication succeeds.

20. The method of claim 11, wherein a mapping relationship for the physical address interval is not established in a memory management unit of the electronic device.

21. A non-transitory computer readable medium that stores a set of instructions that is executable by at least one processor of an electronic device to cause the electronic device to perform a method for accessing private data in a physical memory of an electronic device, the method comprising:
receiving a request for accessing the private data from a process running in the electronic device; and
accessing private data in a physical address interval of the physical memory through a secure memory access interface of a virtual machine monitor of the electronic device, wherein the secure memory access interface is configured to access the private data in the physical address interval of the physical memory without using a mapping relationship associated with the physical address interval for the private data.

22. The non-transitory computer readable medium of claim 21, wherein the access comprises at least one of reading or writing.

23. The non-transitory computer readable medium of claim 21, wherein the set of instructions is executable by the at least one processor of the device to cause the device to further perform accessing private data in a physical address interval of the physical memory through a secure memory access interface of a virtual machine monitor of the electronic device by:
allocating, through the secure memory access interface, a physical address subinterval in the physical address interval to the private data; and
accessing the private data in the physical address subinterval.

24. The non-transitory computer readable medium of claim 23, wherein the set of instructions is executable by the at least one processor of the device to cause the device to further perform:
releasing the physical address subinterval corresponding to the private data in response to a predetermined condition.

25. The non-transitory computer readable medium of claim 21, wherein the set of instructions is executable by the at least one processor of the device to cause the device to further perform receiving a request for accessing private data in the physical memory from a process in the electronic device by:
receiving a request for accessing data in the physical memory from the process; and
determining whether the data is private.

26. The non-transitory computer readable medium of claim 25, wherein the set of instructions is executable by the at least one processor of the device to cause the device to further perform determining whether the data is private by:

in response to the data being plaintext Obtained by decrypting a ciphertext file in a storage device, determining that the data is private.

27. The non-transitory computer readable medium of claim 25, wherein the set of instructions is executable by the at least one processor of the device to cause the device to further perform determining whether the data is private by:

in response to the data being generated by a program of the electronic device, determining that the data is private through a determination routine.

28. The non-transitory computer readable medium of claim 25, wherein the set of instructions is executable by the at least one processor of the device to cause the device to further perform determining whether the data is private by:

in response to the data being acquired by the electronic device externally, prompting a user whether to store the externally acquired data as private data; and determining that the data is private in response to a confirmation made by the user that the externally acquired data needs to be stored as private data.

29. The non-transitory computer readable medium of claim 21, wherein the set of instructions is executable by the at least one processor of the device to cause the device to further perform:

prompting a user to input certification information for accessing the private data; and authenticating the certification information, wherein accessing private data in the physical address interval of the physical memory through a secure memory access interface of a virtual machine monitor of the electronic device is performed when the authentication succeeds.

* * * * *